United States Patent
Chellappan et al.

(10) Patent No.: US 11,163,663 B2
(45) Date of Patent: Nov. 2, 2021

(54) METHOD FOR IMPROVING END USER EXPERIENCE IN VIRTUAL DESKTOP INFRASTRUCTURE BY DIAGNOSING POTENTIAL PERFORMANCE PROBLEMS

(71) Applicant: JPMorgan Chase Bank, N.A., New York, NY (US)

(72) Inventors: Suresh Chellappan, Singapore (SG); Arvind Narayanaswamy, Singapore (SG); Cal Payne, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/843,564

(22) Filed: Apr. 8, 2020

(65) Prior Publication Data

US 2020/0327034 A1 Oct. 15, 2020

Related U.S. Application Data

(60) Provisional application No. 62/831,477, filed on Apr. 9, 2019.

(51) Int. Cl.
| | | |
|---|---|---|
| *G06F 11/00* | (2006.01) | |
| *G06F 11/34* | (2006.01) | |
| *G06N 20/00* | (2019.01) | |
| *G06F 11/07* | (2006.01) | |

(52) U.S. Cl.
CPC ...... *G06F 11/3452* (2013.01); *G06F 11/0709* (2013.01); *G06F 11/0772* (2013.01); *G06F 11/3409* (2013.01); *G06N 20/00* (2019.01)

(58) Field of Classification Search
CPC ............. G06F 11/0772; G06F 11/0709; G06F 11/3409; G06F 11/3428; G06F 11/3452
See application file for complete search history.

(56) References Cited

U.S. PATENT DOCUMENTS

| | | | | |
|---|---|---|---|---|
| 9,600,394 | B2* | 3/2017 | Salunke | G06F 11/3612 |
| 10,048,996 | B1* | 8/2018 | Bell | G06F 11/3006 |
| 10,073,753 | B2* | 9/2018 | Boyapalle | G06F 11/3055 |
| 10,462,027 | B2* | 10/2019 | Chauhan | H04L 41/5009 |
| 10,484,301 | B1* | 11/2019 | Shukla | H04L 41/0896 |
| 10,613,962 | B1* | 4/2020 | Delange | G06F 11/3006 |
| 10,635,519 | B1* | 4/2020 | Tang | G06F 11/3447 |
| 10,853,161 | B2* | 12/2020 | Ahad | G06F 11/0793 |
| 2004/0205101 | A1* | 10/2004 | Radhakrishnan | G06F 9/5083 |
| | | | | 709/200 |

(Continued)

*Primary Examiner* — Elmira Mehrmanesh
(74) *Attorney, Agent, or Firm* — Greenblum & Bernstein, P.L.C.

(57) ABSTRACT

A method for improving end user experience in a virtual desktop infrastructure that includes a plurality of user devices is provided. The method includes receiving data that relates to respective resource usage by each of the user devices, calculating and monitoring metrics that are based on the resource usage data, analyzing the metrics to determine a system performance problem, and generating an alert message that notifies appropriate personnel about the problem diagnosis. The virtual desktop infrastructure may include more than one thousand devices, and as a result, the problem diagnosis may be useful for predicting and preventing a subsequent occurrence of the problem in many devices for which the problem has not yet become manifested.

20 Claims, 4 Drawing Sheets

(56) References Cited

U.S. PATENT DOCUMENTS

| | | | | |
|---|---|---|---|---|
| 2015/0081880 A1* | 3/2015 | Eaton | ............ | H04L 43/0817 |
| | | | | 709/224 |
| 2016/0300142 A1* | 10/2016 | Feller | ............ | G06N 20/00 |
| 2016/0350173 A1* | 12/2016 | Ahad | ............ | G06F 11/0751 |
| 2019/0213099 A1* | 7/2019 | Schmidt | ............ | G06F 9/5083 |
| 2019/0340094 A1* | 11/2019 | Lu | ............ | G06F 11/3447 |
| 2019/0347148 A1* | 11/2019 | Gomes Pereira | ..... | G06F 11/079 |

* cited by examiner

METHOD FOR IMPROVING END USER EXPERIENCE IN VIRTUAL DESKTOP INFRASTRUCTURE BY DIAGNOSING POTENTIAL PERFORMANCE PROBLEMS

CROSS-REFERENCE TO RELATED APPLICATION

This application claims the benefit of U.S. Provisional Patent Application Ser. No. 62/831,477, filed Apr. 9, 2019, which is hereby incorporated by reference in its entirety.

BACKGROUND

1. Technical Field

The present disclosure relates to the field of virtual desktop infrastructures. More particularly, the present disclosure relates to a method for improving end user experience in a virtual desktop infrastructure based on analysis of usage data and metrics to diagnose potential system performance problems.

2. Background

A virtual desktop infrastructure (VDI) is a system that provides virtualization technology that hosts a desktop operating system on a centralized server that is accessible by client end-user computer stations via a computer network. The use of a VDI may enable an end user to remotely access various applications that are typically accessed from specific locations, such as, for example, an office of an employer. In this manner, an employee may have an ability to make use of the employer's VDI in order to perform normal business tasks from any location at which the employee's computer is able to access the Internet.

As with any computer network, the use of a VDI may give rise to system performance issues that cause delays or cessation of access to a given application. When such a system performance problem occurs, a user may effectively be rendered unable to proceed with the intended activity, until the cause of the problem is identified and resolved. Thus, there is a need for mitigating system performance problems by diagnosing the problems before they become manifested, in order to minimize the frequency of such disruptions.

SUMMARY

The present disclosure, through one or more of its various aspects, embodiments, and/or specific features or sub-components, provides, inter alia, various systems, servers, devices, methods, media, programs, and platforms for improving end user experience in a virtual desktop infrastructure based on analysis of usage data and metrics to diagnose potential system performance problems.

According to an aspect of the present disclosure, a method for improving end user experience in a virtual desktop infrastructure that includes a plurality of user devices and at least one server is provided. The method is implemented by at least one processor. The method includes: receiving, by the at least one processor from each of the plurality of user devices, respective data that relates to user resource usage; receiving, by the at least one processor from each of the at least one server, respective data that relates to server resource usage; calculating, by the at least one processor, at least one metric based on the received user resource usage data and the received server resource usage data; analyzing, by the at least one processor, each of the calculated at least one metric to determine a system performance problem that has occurred with respect to at least one user device from among the plurality of user devices; and generating, by the at least one processor, an alert message that relates to the determined system performance problem.

The at least one metric may include at least one from among a session utilization metric, a server utilization metric, an application utilization metric, a session user interface latency metric, and a user interface delay metric.

The system performance problem may include at least one from among a performance lag problem, a capacity problem that relates to an excessive number of active sessions on a user device, a network latency problem, and an application latency problem.

The plurality of user devices may include at least one thousand user devices.

The alert message may include information that identifies the determined system performance problem and diagnostic data that relates to the determination of the system performance problem.

The analyzing may include applying at least one machine learning algorithm to each of the calculated at least one metric.

The method may further include using a result of the analyzing to determine an optimal value of the at least one metric for minimizing an effect of the determined system performance problem.

According to another aspect of the present disclosure, a computing apparatus for improving end user experience in a virtual desktop infrastructure that includes a plurality of user devices and at least one server is provided. The computing apparatus includes a processor, a memory, and a communication interface coupled to each of the processor and the memory. The processor is configured to: receive, from each of the plurality of user devices via the communication interface, respective data that relates to user resource usage; receive, from each of the at least one server via the communication interface, respective data that relates to server resource usage; calculate at least one metric based on the received user resource usage data and the received server resource usage data; analyze each of the calculated at least one metric to determine a system performance problem that has occurred with respect to at least one user device from among the plurality of user devices; and generate an alert message that relates to the determined system performance problem.

The at least one metric may include at least one from among a session utilization metric, a server utilization metric, an application utilization metric, a session user interface latency metric, and a user interface delay metric.

The system performance problem may include at least one from among a performance lag problem, a capacity problem that relates to an excessive number of active sessions on a user device, a network latency problem, and an application latency problem.

The plurality of user devices may include at least one thousand user devices.

The alert message may include information that identifies the determined system performance problem and diagnostic data that relates to the determination of the system performance problem.

The processor may be further configured to perform the analysis by applying at least one machine learning algorithm to each of the calculated at least one metric.

The processor may be further configured to use a result of the analysis to determine an optimal value of the at least one metric for minimizing an effect of the determined system performance problem.

According to another aspect of the present disclosure, a method for improving end user experience in a virtual desktop infrastructure that includes a plurality of user devices and at least one server is provided. The method is implemented by at least one processor. The method includes: receiving, by the at least one processor from each of the plurality of user devices, respective data that relates to user resource usage; receiving, by the at least one processor from each of the at least one server, respective data that relates to server resource usage; calculating, by the at least one processor, at least one metric based on the received user resource usage data and the received server resource usage data; analyzing, by the at least one processor, each of the calculated at least one metric to determine a projected system performance problem that is expected to occur with respect to at least one user device from among the plurality of user devices; and generating, by the at least one processor, an alert message that relates to the projected system performance problem.

The at least one metric may include at least one from among a session utilization metric, a server utilization metric, an application utilization metric, a session user interface latency metric, and a user interface delay metric.

The projected system performance problem may include at least one from among a performance lag problem, a capacity problem that relates to an excessive number of active sessions on a user device, a network latency problem, and an application latency problem.

The alert message may include information that identifies the projected system performance problem and diagnostic data that relates to the determination of the projected system performance problem.

The analyzing may include applying at least one machine learning algorithm to each of the calculated at least one metric.

The method may further include using a result of the analyzing to determine an optimal value of the at least one metric for minimizing an effect of the projected system performance problem.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

End users typically face many issues in the virtual desktop infrastructure (VDI) platforms and applications that they use. These issues generally require the engagement of information technology (IT) support teams for resolution. However, in many instances, an IT support team may become aware of the existence of an issue or a problem only after receiving a report of a problem. In the time required to address the problem, the impact of the problem may increase significantly. For example, the problem may cause disruptions to increasing numbers of end users. Conversely, if the impact of the problem is lessened before being addressed, the root cause of the problem may not be determined, thereby increasing the likelihood of a recurrence of the problem. For these reasons, the methodology of the present disclosure has been developed in order to improve a capability of diagnosing system performance problems in a timely manner and to address the problems in advance of disruptions to significant numbers of end users. In this aspect, in some organizations, the potential number of end users on the VDI system may be in the dozens, hundreds, or in excess of one thousand (1000). In one example, a company may have hundreds of thousands of employees that are located in many disparate locations around the world, and each of these employees may potentially be a VDI end user at any given time.

Common concerns from end users may include, for example, the following: VDI performance suddenly becoming slow; frequent lags and disconnects; frequent application crashes; and/or impact to productivity while waiting for IT personnel to resolve an issue. These concerns may be manifested by the VDI system as symptoms, including one or more of the following: high server utilization; high session latency that is specific to end-user session; application crash logs; user interface delays within a session; and/or network-related problems.

Figure 1:
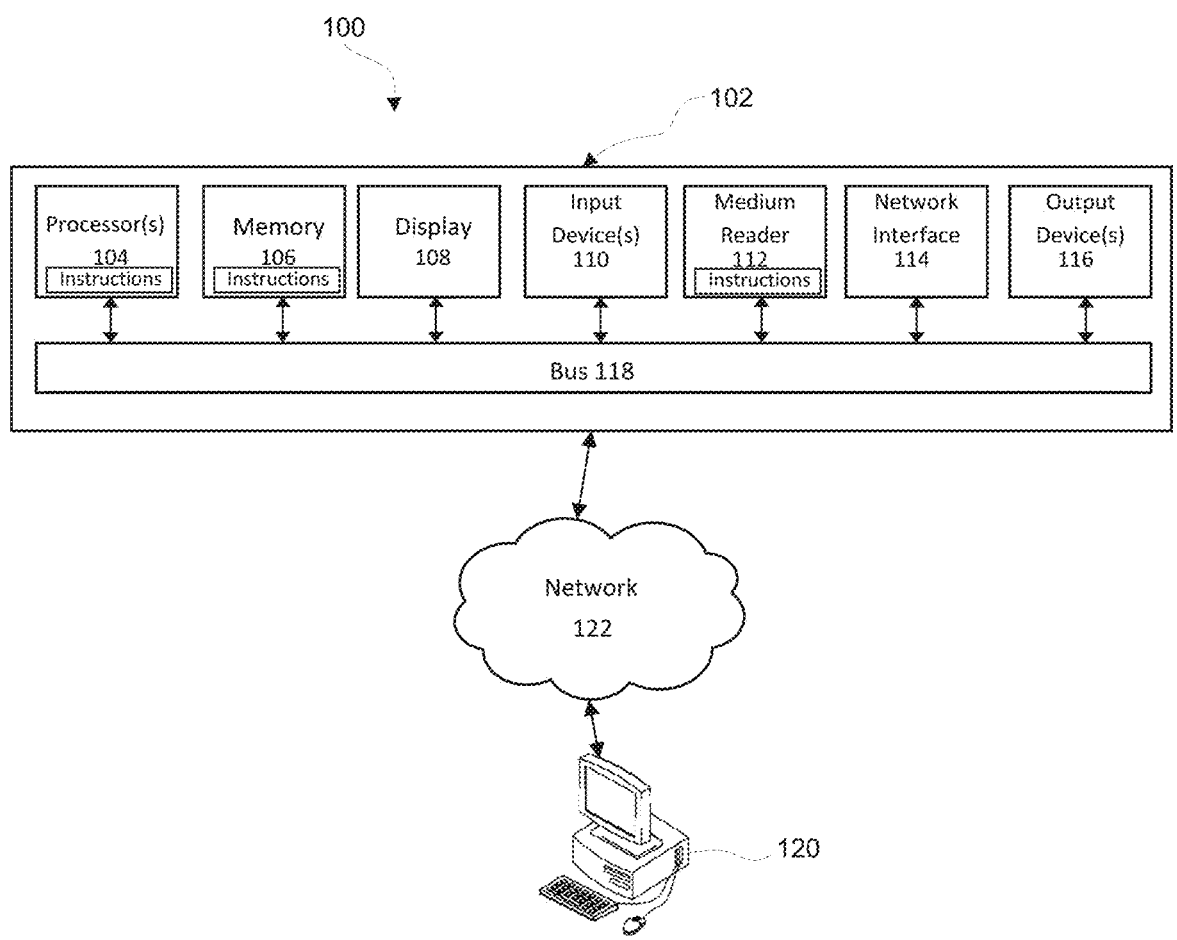
FIG. 1 illustrates an exemplary computer system for accessing a virtual desktop infrastructure and for improving end user experience in the virtual desktop infrastructure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
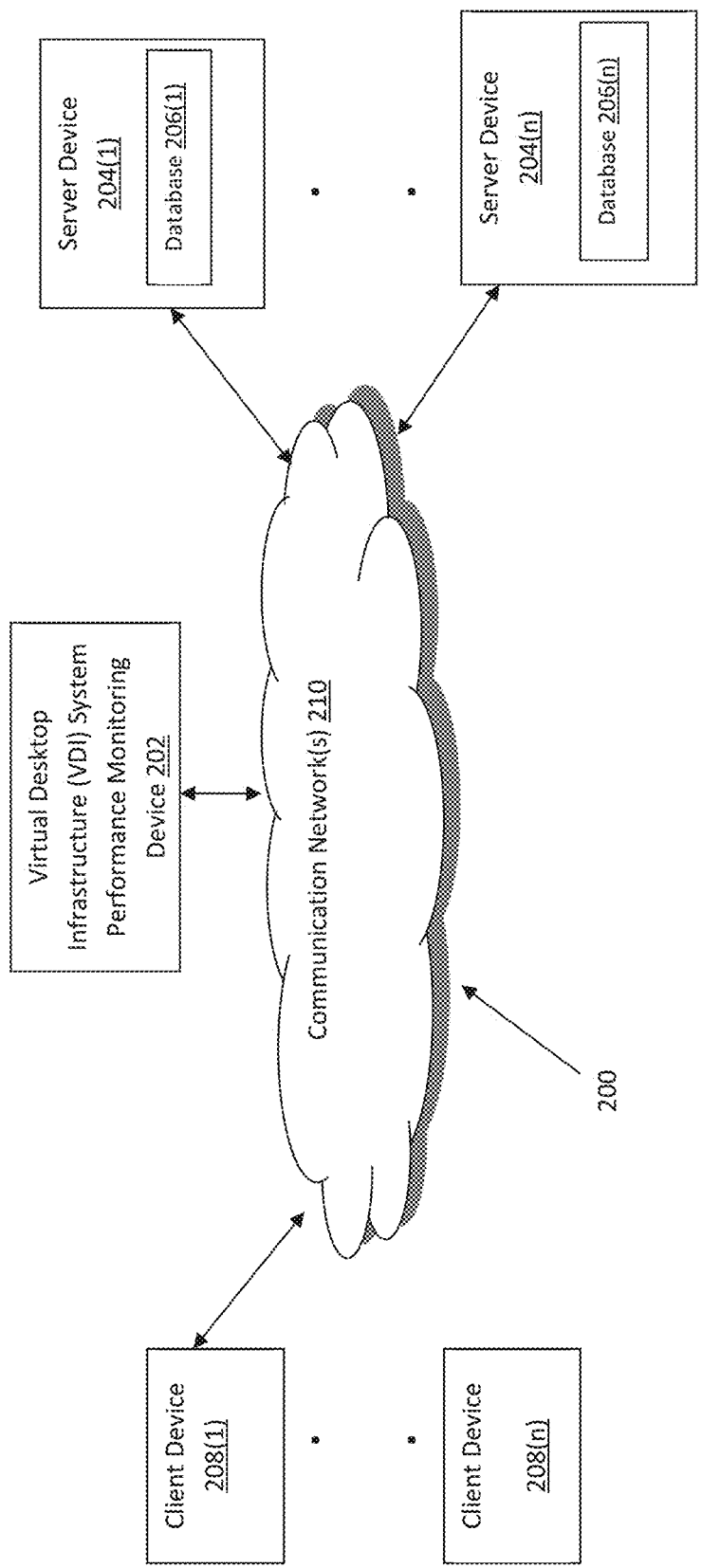
FIG. 2 illustrates an exemplary diagram of a network environment with a virtual desktop infrastructure problem diagnosis device.

Referring to FIG. 2, a schematic of an exemplary network environment 200 for providing a virtual desktop infrastructure (VDI) and for improving end user experience in the VDI based on analysis of usage data and metrics to diagnose potential system performance problems is illustrated.

The VDI system performance improvement may be facilitated by a VDI System Performance Monitoring (VSPM) device 202. The VSPM device 202 may be the same or similar to the computer system 102 as described with respect to FIG. 1. The VSPM device 202 may store one or more applications that can include executable instructions that, when executed by the VSPM device 202, cause the VSPM device 202 to perform actions, such as to receive resource usage data from client devices, monitor system performance metrics, and generate and transmit alerts that relate to diagnoses of system performance problems, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the VSPM device 202 itself, may be located in virtual server(s) running in a cloud-based computing environment rather than being tied to one or more specific physical network computing devices. Also, the application(s) may be running in one or more virtual machines (VMs) executing on the VSPM device 202. Additionally, in one or more embodiments of this technology, virtual machine(s) running on the VSPM device 202 may be managed or supervised by a hypervisor.

In the network environment 200 of FIG. 2, the VSPM device 202 is coupled to a plurality of server devices 204(1)-204(n) that hosts a plurality of databases 206(1)-206(n), and also to a plurality of client devices 208(1)-208(n) via communication network(s) 210. A communication interface of the VSPM device 202, such as the network interface 114 of the computer system 102 of FIG. 1, operatively couples and communicates between the VSPM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the VSPM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and VSPM devices that efficiently facilitate controlling and provisioning resource accesses.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The VSPM device 202 may be a standalone device or integrated with one or more other devices or apparatuses, such as one or more of the server devices 204(1)-204(n), for example. In one particular example, the VSPM device 202 may include or be hosted by one of the server devices 204(1)-204(n), and other arrangements are also possible. Moreover, one or more of the devices of the VSPM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the VSPM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store resource usage data, historical performance metrics data, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can access the VDI. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the VSPM device 202 via the communication network(s) 210 in order to communicate resource usage data. The client devices 208(1)-208(n) may further include, among other features, a display device, such as a display screen or touchscreen, and/or an input device, such as a keyboard, for example.

Although the exemplary network environment 200 with the VSPM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the VSPM device 202, the server devices 204(1)-204(n), or the client devices 208(1)-208(n), for example, may be configured to operate as virtual instances on the same physical machine. In other words, one or more of the VSPM device 202, the server devices 204(1)-204(n), or the client devices 208(1)-208(n) may operate on the same physical device rather than as separate devices communicating through communication network(s) 210. Additionally, there may be more or fewer VSPM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
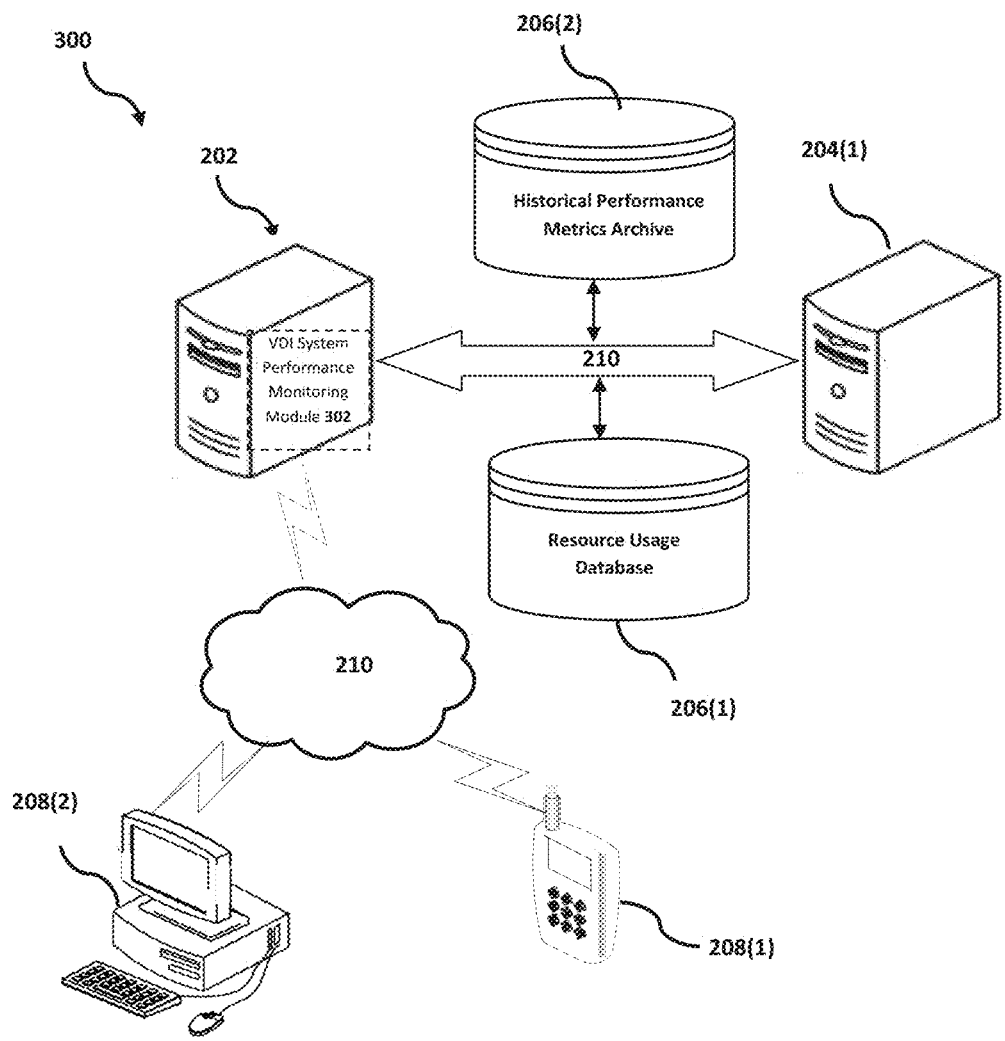
FIG. 3 shows an exemplary system for improving end user experience in a virtual desktop infrastructure based on analysis of usage data and metrics to diagnose potential system performance problems.

The VSPM device 202 is described and shown in FIG. 3 as including a VDI system performance monitoring module 302, although it may include other modules, databases, or applications, for example. As will be described below, the VDI system performance monitoring module 302 is configured to analyze resource usage data and metrics to diagnose potential system performance problems that may disrupt VDI end users. Based on the resource usage data, which may be received from each of client devices 208(1)-208(n), the VDI system performance monitoring module 302 calculates metrics that serve as indicators for various types of system performance problems, and then monitors and analyzes the resource usage data and the metrics to diagnose system performance problems that have occurred or may occur in the near future.

An exemplary process 300 for improving VDI system performance by utilizing the network environment of FIG. 2 is shown as being conducted in FIG. 3. Specifically, a first client device 208(1) and a second client device 208(2) are illustrated as being in communication with VSPM device 202. In this regard, the first client device 208(1) and the second client device 208(2) may be "clients" of the VSPM device 202 and are described herein as such. Nevertheless, it is to be known and understood that the first client device 208(1) and/or the second client device 208(2) need not necessarily be "clients" of the VSPM device 202, or any entity described in association therewith herein. Any additional or alternative relationship may exist between either or both of the first client device 208(1) and the second client device 208(2) and the VSPM device 202, or no relationship may exist.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the VSPM device 202 via broadband or cellular communication. The VSPM device 202 may access resource usage database 206(1) and historical performance metrics archive 206(2). Of course, these embodiments are merely exemplary and are not limiting or exhaustive.

Upon being started, the VDI system performance monitoring module 302 executes a process for improving VDI system performance by analyzing resource usage data and system performance metrics. An exemplary process for improving VDI system performance is generally indicated at flowchart 400 in FIG. 4.

Figure 4:
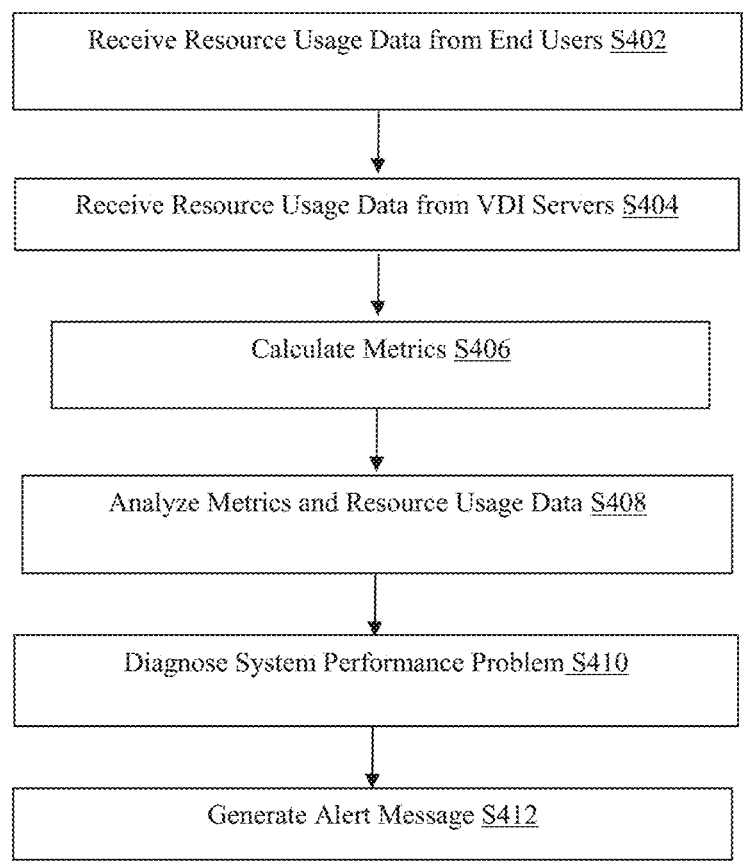
FIG. 4 is a flowchart of an exemplary process for improving end user experience in a virtual desktop infrastructure based on analysis of usage data and metrics to diagnose potential system performance problems.

In the process 400 of FIG. 4, in step S402, resource usage data is received from end users of the VDI system. The user resource usage data may include, for example, central processing unit (CPU) usage data, memory usage data, data that relates to a number of active sessions, and/or application-specific usage data.

At step S404, resource usage data is received from central servers of the VDI system. The server resource usage data may include, for example, CPU usage data, memory usage data, active status data, and/or capacity data.

At step S406, at least one metric is calculated based on the received resource usage data. For example, the metrics may include any of a session utilization metric, a server utilization metric, an application utilization metric, a session user interface latency metric, and a user interface delay metric.

At step S408, the metrics are analyzed. The analysis may include using historical infrastructure data and historical incident data in conjunction with the received resource usage data to determine a likelihood of a future issue, problem, or anomaly. The analysis may implement machine learning algorithms and data mining techniques, such as, for example, time series data mining and neuro linguistic programming (NLP) processing. In an exemplary embodiment, the analysis may be implemented by using one or more of an Apache Spark engine for large-scale data processing and an Apache Kafka platform for building real-time data pipelines and streaming applications.

At step S410, a system performance problem is diagnosed. For example, the system performance problem may be a performance lag problem, a capacity problem that relates to an excessive number of active sessions on an end-user device, a network latency problem, and an application latency problem. In an exemplary embodiment, the system performance problem may be a problem that has already occurred. In an alternative exemplary embodiment, the VDI system performance monitoring module 302 may proactively diagnose a projected system performance problem that is expected to occur, based on the analysis of the metrics.

At step S412, an alert message is generated. The alert message is notified to appropriate personnel, such, as, for example, IT support personnel that may be able to address the diagnosed problem and to take action to prevent additional occurrences of the problem. The alert message may include information that identifies the diagnosed system performance problem and diagnostic data that provides a basis for the diagnosis, which may assist the IT support personnel in determining a resolution of the problem.

In an exemplary embodiment, the analysis of metrics and system performance diagnosis steps initially focus on performance issues in order to determine a maximum threshold of active sessions that a server can host without compromising end user performance. Second, an ongoing analysis of server key performance indicators (KPI) using historical and current data is also performed, in order to dynamically define and set server KPI threshold values based on changing environmental conditions rather than relying on statically assigned values that may not be accurate for all conditions. For example, an application unresponsiveness problem may correlate with a maximum threshold limit/number of sessions parameter; a user interface latency problem may correlate with a CPU and memory usage parameter; and a user experience problem may correlate with a parameter that indicates a number of sessions at any given point of time.

In an exemplary embodiment, the methods and systems for improving end user experience in a virtual desktop infrastructure based on analysis of usage data and metrics to diagnose potential system performance problems address several objectives, including the following: identification of an optimal system capacity that can be managed by a server with minimal impact on end user experience; provision of accurate symptom diagnostics data via proactive alerting to key personnel; proactive mitigation of high-impact issues; reduction of turnaround time needed to resolve incidents; improvement of overall user experience; identification of users having greater resource requirements versus normal users, based on past usages; improvement of infrastructure monitoring by providing support personnel with recommendations for KPI threshold value adjustments based on results of ongoing data analysis; and implementation of a solution to adjust server KPI threshold values in real time based on varying environmental conditions.

Accordingly, with this technology, an optimized process for improving end user experience in a virtual desktop infrastructure system based on analysis of usage data and metrics to diagnose potential system performance problems is provided. The optimized process reduces disruptions to end users by improving an ability to identify issues and/or predict potential problems before the problems become manifested to the end users, thereby improving productivity and efficiency in accessing the functionalities of the VDI system.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for improving end user experience in a virtual desktop infrastructure that includes a plurality of user devices and at least one server, the method being implemented by at least one processor, the method comprising:
   receiving, by the processor from each of the plurality of user devices, respective data that relates to user resource usage;
   receiving, by the processor from each of the at least one server, respective data that relates to server resource usage;
   calculating, by the processor, at least one metric based on the received user resource usage data and the received server resource usage data;
   analyzing, by the processor, each of the calculated at least one metric to determine a system performance problem that has occurred with respect to at least one user device from among the plurality of user devices;
   generating, by the processor, an alert message that relates to the determined system performance problem;
   defining, by the processor, a threshold value for each of a plurality of key performance indicators by using the at least one metric, at least one corresponding historical metric, and at least one environmental condition that corresponds to the at least one server, the plurality of key performance indicators corresponding to the at least one server; and
   automatically adjusting, by the processor in real-time, the threshold value for each of the plurality of key performance indicators for the at least one server.

2. The method of claim 1, wherein the at least one metric includes a session utilization metric, a server utilization metric, an application utilization metric, a session user interface latency metric, and a user interface delay metric.

3. The method of claim 1, wherein the system performance problem includes at least one from among a performance lag problem, a capacity problem that relates to an excessive number of active sessions on a user device, a network latency problem, and an application latency problem.

4. The method of claim 1, wherein the plurality of user devices includes at least one thousand user devices.

5. The method of claim 1, wherein the alert message includes information that identifies the determined system performance problem and diagnostic data that relates to the determination of the system performance problem.

6. The method of claim 1, wherein the analyzing comprises applying at least one machine learning algorithm to each of the calculated at least one metric.

7. The method of claim 1, further comprising using a result of the analyzing to determine an optimal value of the at least one metric for minimizing an effect of the determined system performance problem.

8. A computing apparatus for improving end user experience in a virtual desktop infrastructure that includes a plurality of user devices and at least one server, the computing apparatus comprising:
   a processor;
   a memory; and
   a communication interface coupled to each of the processor and the memory,
   wherein the processor is configured to:
      receive, from each of the plurality of user devices via the communication interface, respective data that relates to user resource usage;
      receive, from each of the at least one server via the communication interface, respective data that relates to server resource usage;
      calculate at least one metric based on the received user resource usage data and the received server resource usage data;
      analyze each of the calculated at least one metric to determine a system performance problem that has occurred with respect to at least one user device from among the plurality of user devices;
      generate an alert message that relates to the determined system performance problem;
      define a threshold value for each of a plurality of key performance indicators by using the at least one metric, at least one corresponding historical metric, and at least one environmental condition that corresponds to the at least one server, the plurality of key performance indicators corresponding to the at least one server; and
      automatically adjust, in real-time, the threshold value for each of the plurality of key performance indicators for the at least one server.

9. The computing apparatus of claim 8, wherein the at least one metric includes a session utilization metric, a server utilization metric, an application utilization metric, a session user interface latency metric, and a user interface delay metric.

10. The computing apparatus of claim 8, wherein the system performance problem includes at least one from among a performance lag problem, a capacity problem that relates to an excessive number of active sessions on a user device, a network latency problem, and an application latency problem.

11. The computing apparatus of claim 8, wherein the plurality of user devices includes at least one thousand user devices.

12. The computing apparatus of claim 8, wherein the alert message includes information that identifies the determined system performance problem and diagnostic data that relates to the determination of the system performance problem.

13. The computing apparatus of claim 8, wherein the processor is further configured to perform the analysis by applying at least one machine learning algorithm to each of the calculated at least one metric.

14. The computing apparatus of claim 8, wherein the processor is further configured to use a result of the analysis to determine an optimal value of the at least one metric for minimizing an effect of the determined system performance problem.

15. A method for improving end user experience in a virtual desktop infrastructure that includes a plurality of user devices and at least one server, the method being implemented by at least one processor, the method comprising:
   receiving, by the at least one processor from each of the plurality of user devices, respective data that relates to user resource usage;
   receiving, by the at least one processor from each of the at least one server, respective data that relates to server resource usage;
   calculating, by the at least one processor, at least one metric based on the received user resource usage data and the received server resource usage data;
   analyzing, by the at least one processor, each of the calculated at least one metric to determine a projected system performance problem that is expected to occur with respect to at least one user device from among the plurality of user devices;
   generating, by the at least one processor, an alert message that relates to the projected system performance problem;
   defining, by the at least one processor, a threshold value for each of a plurality of key performance indicators by using the at least one metric, at least one corresponding historical metric, and at least one environmental condition that corresponds to the at least one server, the plurality of key performance indicators corresponding to the at least one server; and
   automatically adjusting, by the at least one processor in real-time, the threshold value for each of the plurality of key performance indicators for the at least one server.

16. The method of claim 15, wherein the at least one metric includes a session utilization metric, a server utilization metric, an application utilization metric, a session user interface latency metric, and a user interface delay metric.

17. The method of claim 15, wherein the projected system performance problem includes at least one from among a performance lag problem, a capacity problem that relates to an excessive number of active sessions on a user device, a network latency problem, and an application latency problem.

18. The method of claim 15, wherein the alert message includes information that identifies the projected system performance problem and diagnostic data that relates to the determination of the projected system performance problem.

19. The method of claim 15, wherein the analyzing comprises applying at least one machine learning algorithm to each of the calculated at least one metric.

20. The method of claim 15, further comprising using a result of the analyzing to determine an optimal value of the at least one metric for minimizing an effect of the projected system performance problem.

* * * * *